(12) United States Patent
Wada

(10) Patent No.: US 8,054,342 B2
(45) Date of Patent: Nov. 8, 2011

(54) IMAGING APPARATUS AND METHOD FOR DRIVING THE IMAGING APPARATUS

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 457 days.

(21) Appl. No.: 12/414,032

(22) Filed: Mar. 30, 2009

(65) Prior Publication Data
US 2009/0251575 A1    Oct. 8, 2009

(30) Foreign Application Priority Data

Apr. 1, 2008 (JP) ................................ P2008-095397
Mar. 12, 2009 (JP) ................................ P2009-059367

(51) Int. Cl.
*H04N 9/68* (2006.01)
*H04N 5/235* (2006.01)

(52) U.S. Cl. ....................... 348/234; 348/236; 348/230.1

(58) Field of Classification Search ............... 348/216.1, 348/230.1, 234, 236, 273, 275, 276, 277, 348/279, 280, 281, 282, 302, 308, 311
See application file for complete search history.

(56) References Cited

U.S. PATENT DOCUMENTS 7,324,144 B1    1/2008  Koizumi
7,847,857 B2 *  12/2010 Saito et al. .................... 348/364
2007/0206110 A1  9/2007  Wada
2008/0172289 A1  7/2008  Oh et al.
2008/0173794 A1  7/2008  Oike et al.
2009/0135281 A1 * 5/2009 Oda et al. ...................... 348/273

FOREIGN PATENT DOCUMENTS

| JP | 7-250286 A | 9/1995 |
| JP | 2001-17775 | 6/2001 |
| JP | 2007-124137 A | 5/2007 |
| JP | 2007-135200 | 5/2007 |
| JP | 2007-214832 | 8/2007 |
| JP | 2007-235656 | 9/2007 |
| JP | 2007-258686 A | 10/2007 |
| JP | 2008-172289 | 7/2008 |

* cited by examiner

*Primary Examiner* — David N Spector
(74) *Attorney, Agent, or Firm* — Birch, Stewart, Kolasch & Birch, LLP

(57) ABSTRACT

An imaging apparatus includes a solid-state imaging device, a derive section and a signal processing section. The imaging device includes plural pixels arranged on a surface of a semiconductor substrate. The pixels include plural chromatic color pixels for plural colors and plural high-sensitivity pixels having a higher sensitivity to incident light than the chromatic color pixels. The drive section controls the imaging device to simultaneously start exposing the chromatic color pixels and exposing the high-sensitivity pixels, to read first signals from the high-sensitivity pixels during an exposure period, respectively and hold the read first signals, thereafter, to read second signals from the high-sensitivity pixels, respectively, and to read third signals from the chromatic color pixels, respectively. The signal processing section produces color image data based on the first signals, the second signals and the third signals.

24 Claims, 10 Drawing Sheets

IMAGING APPARATUS AND METHOD FOR DRIVING THE IMAGING APPARATUS

CROSS-REFERENCE TO RELATED APPLICATIONS

This application claims the benefit of Japanese Patent Application Nos. 2008-95397, filed Apr. 1, 2008, and 2009-59367, filed Mar. 12, 2009, the entire contents of which are hereby incorporated by reference, the same as if set forth at length.

BACKGROUND OF THE INVENTION

1. Field of the Invention

The present invention relates to an imaging apparatus and a method for driving the same.

2. Description of Related Art

Presently, for an imaging device mounted on an imaging apparatus such as a digital camera or the like, there is proposed a structure in which photoelectric conversion elements for extracting a luminance component as well as photoelectric conversion elements for extracting color components are two-dimensionally arranged in an element region in order to produce a high-resolution color image. Color filters are provided on the photoelectric conversion elements for extracting the color components, and signal charges generated in the photoelectric conversion elements are output as color signals. On the other hand, transparent and colorless filters or no color filters are provided on the photoelectric conversion elements for extracting the luminance component. Thereby, signal charges generated in the photoelectric conversion elements are output as luminance signals. In the imaging apparatus, such as a digital camera, having the imaging device with this type structure, a color image having a high-resolution luminance component can be obtained. For example, JP 2007-258686 A (corresponding to US 2007/0206110 A) and JP Hei.7-250286 A relate to this technology.

SUMMARY OF THE INVENTION

However, since the photoelectric conversion elements for extracting the luminance component has high sensitivity to incident light as compared with the photoelectric conversion elements for extracting the color components provided with the color filters or the like, when imaging is performed for the same exposure period, signal charges reach the saturation quantity in the photoelectric conversion elements for extracting the luminance component before those in the photoelectric conversion elements for extracting the color components reach. Consequently, there has been a room for improvement in obtaining a saturation charge quantity appropriate to a high sensitivity.

The present invention has been made in view of the above circumstances, and the invention provides an imaging apparatus and a method for driving the imaging apparatus, which can substantially increase saturation charge quantities of the photoelectric conversion units for extracting the luminance signal while securing simultaneity in exposure periods for the luminance signals and the color signals obtained in the photoelectric conversion units.

(1) According to an aspect of the invention, an imaging apparatus includes a solid-state imaging device, a drive section and a signal processing section. The solid-state imaging device includes a plurality of pixels arranged on a surface of a semiconductor substrate. The plurality of pixels include a plurality of chromatic color pixels for plural colors and a plurality of high-sensitivity pixels having a higher sensitivity to incident light than the chromatic color pixels. The drive section controls the solid-state imaging device to simultaneously start exposing the chromatic color pixels and exposing the high-sensitivity pixels, to read first signals from the high-sensitivity pixels during an exposure period, respectively and hold the read first signals, thereafter, to read second signals from the high-sensitivity pixels, respectively, and to read third signals from the chromatic color pixels, respectively. The signal processing section produces color image data based on the first signals, the second signals and the third signals.

(2) In the imaging apparatus of (1), the high-sensitivity pixels and the chromatic color pixels may be arranged at an identical arrangement pitch at positions shifted from each other by one half of the arrangement pitch in row and column directions.

(3) In the imaging apparatus of (1), the high-sensitivity pixels and the chromatic color pixels may be arranged at an identical arrangement pitch in an arrangement obtained by slanting a square lattice configuration having a 2×2 period.

(4) The imaging apparatus of (1) may further include a pixel-signal holding section that holds the first signals.

(5) In the imaging apparatus of (4), the first signals may be held in the pixel-signal holding section in a state where the first signals have been mixed.

(6) The imaging apparatus of (4) may further include a vertical transfer section and a horizontal transfer section. The vertical transfer section transfers signal charges read from the plurality of pixels, in a column direction. The horizontal transfer section transfers the signal charges, which are transferred from the vertical transfer section, in a row direction. The vertical transfer section includes the pixel holding section.

(7) In the imaging apparatus of (1), the first signals may include signal charges that are read plural times from the high-sensitivity pixels during the exposure period.

(8) In the imaging apparatus of (1), a period for reading the first signals may be shorter than a period for reading the second signals.

(9) The imaging apparatus of (1) may further include a light emission section that emits light to a subject during the exposure period. Signal charges are read from the high-sensitivity pixels and are divided into the first signals and the second signals based on a light emission period of the light emission section, during the exposure period.

(10) In the imaging apparatus of (1), the first, second and third signals may be output to the signal processing section after an end of the exposure period.

(11) In the imaging apparatus of (1), the first and second signals may be output to the signal processing section in a state where the first and second signals are mixed to each other.

(12) In the imaging apparatus of (1), a timing at which the first signals are read from at least a part of the higher sensitivity pixels may be different from a timing at which the first signals are read from another part of the high sensitivity pixels.

(13) According to another aspect of the invention, an imaging apparatus includes a solid-state imaging device. The solid-state imaging device includes a plurality of pixels arranged on a surface of a semiconductor substrate. The plurality of pixels have a plurality of chromatic color pixels for plural colors and a plurality of high-sensitivity pixels having a higher sensitivity to incident light than the chromatic color pixels. A method for driving the imaging apparatus includes: simultaneously starting exposing the color pixels and exposing the high-sensitivity pixels, reading first signals from the high-sensitivity pixels during an exposure period, respectively; holding the read first signals; thereafter, reading second signals from the high-sensitivity pixels respectively; reading third signals from the chromatic color pixels respectively; and producing color image data based on the first signals, the second signals and the third signals.

(14) In the method of (13), the high-sensitivity pixels and the chromatic color pixels may be arranged at an identical arrangement pitch at positions shifted from each other by one half of the arrangement pitch in row and column directions.

(15) In the method of (13), the high-sensitivity pixels and the chromatic color pixels may be arranged at an identical arrangement pitch in an arrangement obtained by slanting a square lattice configuration having a 2×2 period.

(16) The method of (13) may further include holding the first signals in a pixel-signal holding section.

(17) In the method of (16), the first signals may be held in the pixel-signal holding section in a state where the first signals have been mixed.

(18) In the method of (16), the imaging apparatus may include a vertical transfer section and a horizontal transfer section. The vertical transfer section transfers signal charges read from the plurality of pixels, in a column direction. The horizontal transfer section transfers the signal charges, which are transferred from the vertical transfer section, in a row direction. The vertical transfer section includes the pixel holding section.

(19) In the method of (13), the first signals may include signal charges that are read plural times from the high-sensitivity pixels during the exposure period.

(20) In the method of (13), a period for reading the first signals may be shorter than a period for reading the second signals.

(21) In the method of (13), the imaging apparatus may further include a light emission section that emits light to a subject during the exposure period. Signal charges may be read from the high-sensitivity pixels and may be divided into the first signals and the second signals based on a light emission period of the light emission section, during the exposure period.

(22) In the method of (13), the first, second and third signals may be output to a signal processing section that produces the color image data, after an end of the exposure period.

(23) In the method of (13), the first and second signals may be output to a signal processing section that produces the color image data, in a state where the first and second signals are mixed to each other.

(24) In the method of (13), a timing at which the first signals are read from at least a part of the higher sensitivity pixels may be different from a timing at which the first signals are read from another part of the high sensitivity pixels.

DETAILED DESCRIPTION OF EMBODIMENTS OF THE INVENTION

Embodiments of the present invention will be described below in detail with reference to the drawings.

Figure 1:
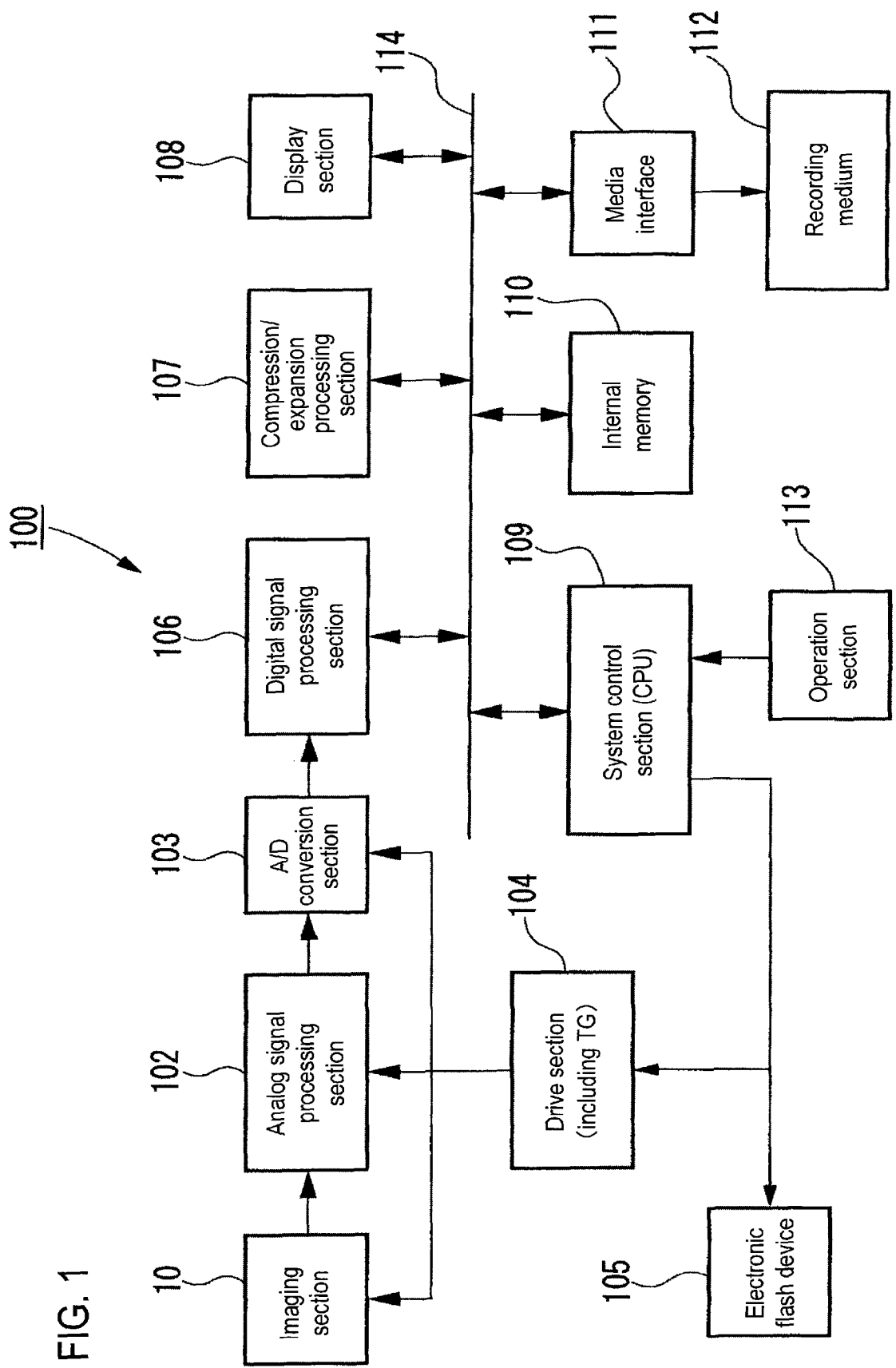
FIG. 1 is a view showing a schematic structure of an imaging apparatus.

FIG. 1 is a view showing a schematic structure of an imaging apparatus of an embodiment according to the present invention. In the present embodiment, description will be given using the structure of a digital camera as one example of the imaging apparatus. An imaging apparatus 100 of FIG. 1 has an imaging section 10, an analog signal processing section 102, an A/D conversion section 103, a drive section 104, an electronic flash device 105, a digital signal processing section 106, a compression/expansion processing section 107, a display section 108, a system control section 109, an internal memory 110, a media interface 111, a recording medium 112, and an operation section 113. Each of the digital signal processing section 106, the compression/expansion processing section 107, the display section 108, the system control section 109, the internal memory 110, and the media interface section 111 is connected to a system bus 114.

The imaging section 10 photographs a subject using an optical system such as a photographing lens and a solid-state imaging device described later, and outputs an analog imaging signal. The imaging section 10 includes a mechanical shutter for performing shutting control of an incidence of light to the solid-state imaging device. The analog signal processing section 102 performs predetermined analog signal processing for the imaging signal obtained in the imaging section 10. The A/D conversion section 103 converts the analog signal for which the analog signal processing section 102 has performed the predetermined signal processing, into a digital signal. An output of the A/D conversion section 103 is sent to the digital signal processing section 106 as what is called RAW image data. The RAW image data is digital image data that is obtained by digitalizing the imaging signal from the imaging section 10 without changing the format of the imaging signal from the imaging section 10.

At the time of photographing, control of the optical system, the mechanical shutter, and the solid-state imaging device is performed via the drive section 104. The solid-state imaging device is driven with a drive signal from a timing generator (described as TG in FIG. 1) included in the drive section 104 at a predetermined timing in response to an ON state of a two-step release switch (not shown) that is caused by an operation of a release button (not shown) that is a part of the operation section 113. The system control section causes the drive section 104 to output a predetermined drive signal.

The digital signal processing section 106 performs digital signal processing in accordance with an operational mode set by the operation section 113, for the digital image data from the A/D conversion section 103. The processing performed by the digital signal processing section 106 includes black level correction processing (OB processing), linear matrix correction processing, white balance adjustment processing, gamma correction processing, image synthesis processing, synchronization processing, and Y/C conversion processing. The digital signal processing section 106 is implemented by, e.g., a DSP.

The compression/expansion processing section 107 performs compression processing for Y/C data obtained in the digital signal processing section 106, and also performs expansion processing for compressed image data obtained from the recording medium 112.

The display section 108 is configured so as to include, e.g., a LCD display device, and displays an image based on the image data photographed and subjected to the digital signal processing. The display section 108 also displays an image based on the image data obtained by performing the expansion processing for the compressed image data recorded in the recording medium 112. In addition, the display section 108 can also display a through image (live view image) at the time of photographing, various states of the digital camera, information regarding operations, and the like.

The internal memory 110 is, e.g., a DRAM, and is used as a work memory for the digital signal processing section 106 or the system control section 109 as well as a buffer memory for temporarily storing photographed image data to be recorded in the recording medium 112 and a buffer memory for display image data to be displayed on the display section 108. The media interface 111 inputs/outputs data to/from the recording medium 112 such as a memory card.

The system control section 109 is configured mainly of a processor that is operated by a predetermined program, and performs control of the entire digital camera, including a photographing operation.

The operation section 113 is used to perform various operations when the digital camera is in use, and includes the release button and the like.

The digital camera shown in FIG. 1 is capable of changing the setting of photographing sensitivity. For example, with regard to a film speed, the digital camera can be switched between a low-sensitivity photographing mode in which photographing is performed at the sensitivity corresponding to an ISO speed of 100, and a high-sensitivity photographing mode in which photographing is performed at any of the sensitivities corresponding to the ISO speeds of 200, 400, and 800.

Figure 2:
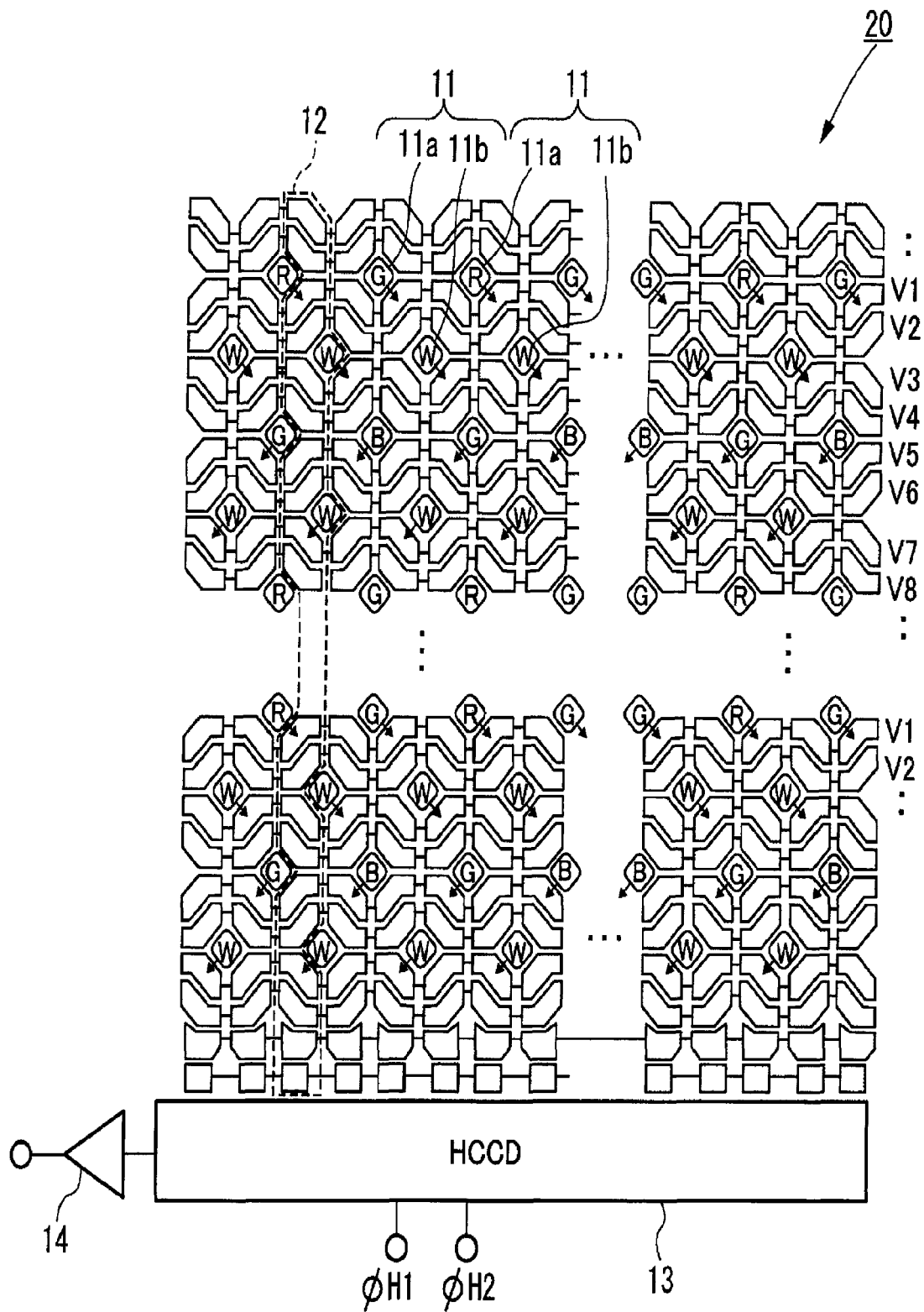
FIG. 2 is a schematic plan view for illustrating a structure of a solid-state imaging device.

FIG. 2 is a schematic plan view for illustrating the structure of a solid-state imaging device according to the present embodiment. In the solid-state imaging device, a plurality of photoelectric conversion units 11 such as photodiodes are two-dimensionally arranged on a light receiving area of a semiconductor substrate. In the present embodiment, each of the photoelectric conversion units 11 corresponds to one pixel constituting an image, and may also be simply referred to as a pixel.

When a vertical direction is assumed to be a column direction, and a horizontal direction is assumed to be a row direction in FIG. 2, the photoelectric conversion units 11 are provided in the row and column directions on the surface of the semiconductor substrate, and the photoelectric conversion units 11 in odd rows and the photoelectric conversion units 11 in even rows are arranged with being shifted by one half of a pitch (what is called a "honeycomb pixel arrangement"). In the present embodiment, the photoelectric conversion units 11 include photoelectric conversion units 11a for extracting color components (an example of chromatic color pixels) and photoelectric conversion units 11b for extracting a luminance component (an example of high-sensitivity pixels). In the following description, the photoelectric conversion units 11a and the photoelectric conversion units 11b may be collectively referred to as simply the photoelectric conversion units 11. The high-sensitivity pixels have a higher sensitivity to incident light than the chromatic color pixels. The plurality of chromatic color pixels and the plurality of high-sensitivity pixels may also be collectively referred to as a plurality of pixels.

The solid-state imaging device 20 is provided with a plurality of vertical transfer sections 12 for transferring signal charges read from the photoelectric conversion units 11 in the column direction, a horizontal transfer section 13 for transferring the signal charges, which are transferred from the plurality of vertical transfer sections 12, in the row direction, and an output amplifier 14 for outputting voltage signals corresponding to the signal charges from the horizontal transfer section 13.

The vertical transfer sections 12 include a plurality of vertical transfer channels (not shown) that are formed on the semiconductor substrate so as to correspond to the plurality of photoelectric conversion units 11 being disposed in the column direction, a plurality of vertical transfer electrodes V1 to V8 each of which is formed so as to intersect the respective vertical transfer channels (the vertical transfer electrodes V1 to V8 are provided to extend in a left-to-right direction in FIG. 2), and charge read areas for reading the signal charges of the respective photoelectric conversion units 11 into the vertical transfer channels. The vertical transfer electrodes V1 to V8 of the respective vertical transfer sections 12 are provided to extend between the rows of the photoelectric conversion units 11, to have meandering configurations. The vertical transfer sections 12 are driven by vertical transfer pulses output from the drive section 104 to the vertical transfer electrodes V1 to V8, to transfer signal charges.

The horizontal transfer section 13 has a horizontal transfer channel formed on the semiconductor substrate (which is not shown) and horizontal transfer electrodes provided on the horizontal transfer channel. The horizontal transfer section 13 is driven in two phase by horizontal transfer pulses φH1 and φH2 output from the drive section 104 to the horizontal transfer electrodes.

The output amplifier 14 outputs, as the image signals, voltage value signals in accordance with the quantities of the signal charges transferred to a transfer-direction end portion of the horizontal transfer section 13.

The above description is given using the expressions "vertical" and "horizontal" such as the vertical transfer section 12 and the horizontal transfer section 13, and the terms "vertical" and "horizontal" mean "one direction" in parallel with the surface of the semiconductor substrate and "a direction substantially perpendicular to the one direction", respectively.

In the solid-state imaging device, color filters (not shown) are provided on the light receiving areas in order to detect color image signals.

"R", "G", and "B" shown on each of the photoelectric conversion units 11a indicate the colors of the color filters laminated on the respective photoelectric conversion units 11a, and "R", "G", and "B" indicate red, green, and blue, respectively. The photoelectric conversion units 11 at positions indicated by "R", "G", and "B" represent the photoelectric conversion units for extracting the color components. The photoelectric conversion units 11b at positions indicated by "W" represent the photoelectric conversion units for extracting the luminance component. Each photoelectric conversion unit 11b is configured to receive all of the color components of incident light without any of the color components being absorbed by a filter, for example, configured to have transparent and colorless filter thereabove or to have no filter thereabove.

Signals corresponding to light detected by the photoelectric conversion units 11a may be referred to as color signals or, in some cases, may be referred to as R signals, G signals, or B signals correspondingly to the respective colors. In addition, signals corresponding to light detected by the photoelectric conversion units 11b may be referred to as luminance signals, or, in some cases, may be referred to as first signals and second signals correspondingly to timings of a read operation, as will be described later. Further, the color signals may be referred to as third signals.

In the present embodiment, the photoelectric conversion units 11 are arranged on the surface of the semiconductor substrate in the row and column directions, and the photoelectric conversion units 11a for extracting the color components and the photoelectric conversion units 11b for extracting the luminance component are arranged at the same arrangement pitch at positions shifted from each other by one half of the arrangement pitch in the row and column directions. Specifically, the photoelectric conversion units 11a have the Bayer arrangement of red, green, and blue, and the photoelectric conversion units 11b have the arrangement of a square lattice configuration at the same pitch as that for the photoelectric conversion units 11a and are disposed at positions shifted by one half of the arrangement pitch of the photoelectric conversion units 11a in the row and column directions. The photoelectric conversion units 11a indicated by "R", "G", and "B" are arranged in odd rows, while the photoelectric conversion units 11b indicated by "W" are arranged in even rows.

Pixels corresponding to the photoelectric conversion units 11a indicated by "R", "G", and "B" are also referred to as R pixels, G pixels, and B pixels, and pixels corresponding to the photoelectric conversion units 11b indicated by "W" are also referred to as W pixels.

In the solid-state imaging device 20 of the present embodiment, among the photoelectric conversion units 11a for extracting the color components, the color signals of the photoelectric conversion units 11a in odd rows and the color signals of the photoelectric conversion units 11a in even rows are read into the vertical transfer sections 12 on mutually opposite sides. Among the photoelectric conversion units 11b for extracting the luminance component, the luminance signals of the photoelectric conversion units 11b in odd rows and the luminance signals of the photoelectric conversion units 11b in even rows are read into the vertical transfer sections 12 on mutually opposite sides. A row of the photoelectric conversion units 11a and a row of the photoelectric conversion units 11b arranged below the row of the photoelectric conversion units 11a are arranged so as to correspond to each other. The signal charges of the photoelectric conversion units 11a and 11b in these two rows are read into the vertical transfer sections 12 on the same side, and the signal charges of the photoelectric conversion units 11a and 11b in two rows below the two rows are read into the vertical transfer sections 12 on the opposite side thereto. In other words, the direction of reading the signal charges of the photoelectric conversion units 11a and 11b into the vertical transfer sections 12 is reversed every two rows. The vertical transfer sections 12 also serve as a pixel-signal holding section that can hold the first signals read from the photoelectric conversion units 11a during an exposure period.

Figure 3:
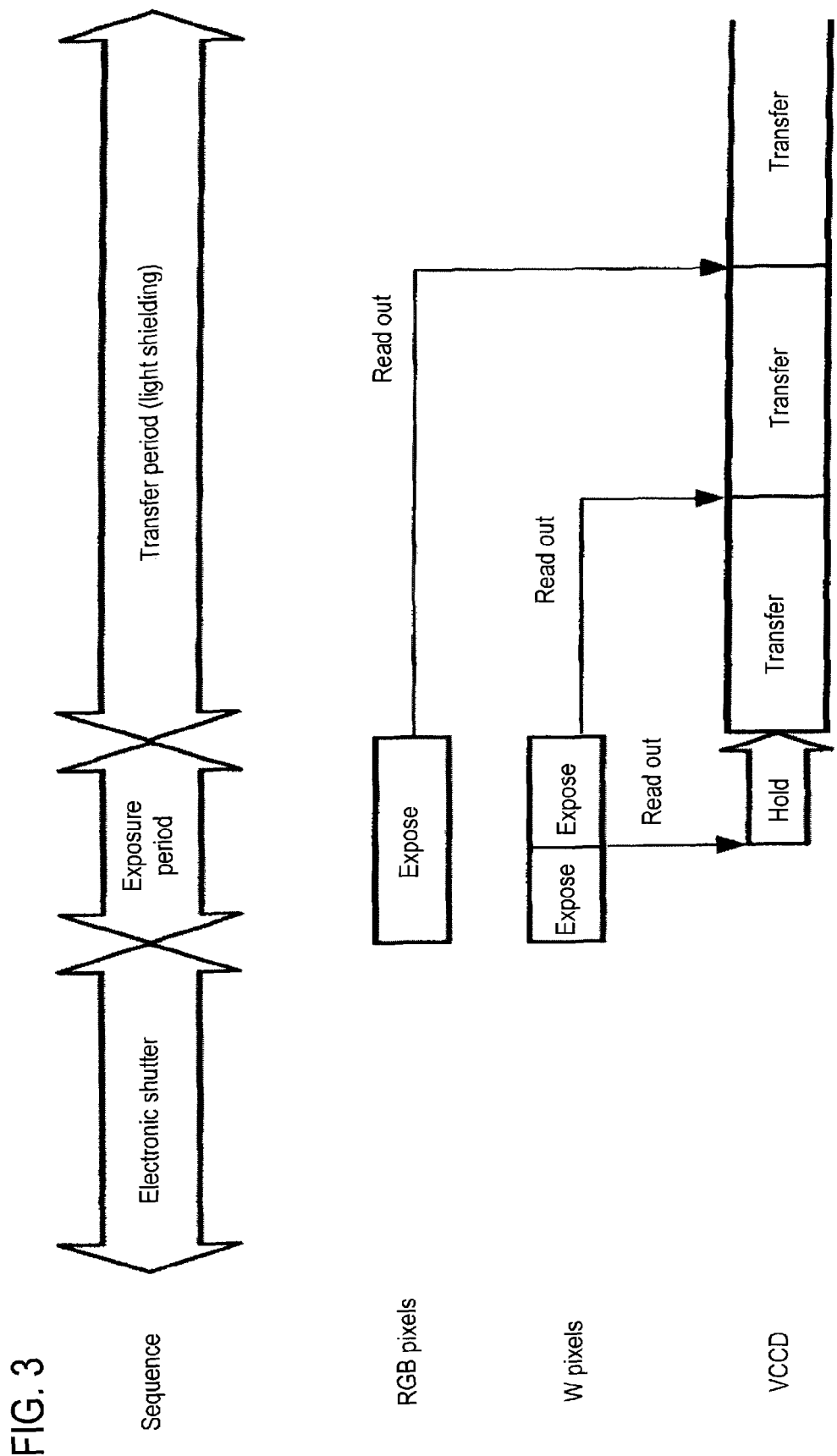
FIG. 3 is a view for illustrating one example of an operation of the imaging apparatus.

FIG. 3 is a view for illustrating one example of an operation of the imaging apparatus of the present embodiment.

In the solid-state imaging device 20 of the present embodiment, an electronic shutter is firstly driven to start the exposure period and, simultaneously, it is started to expose the photoelectric conversion units 11a for extracting the color components (RGB pixels) and the photoelectric conversion units 11b for extracting the luminance component (W pixels).

After a predetermined time period elapses from the start of the exposure period, signal charges accumulated in the photoelectric conversion units 11b are temporarily read into the vertical transfer sections 12 while the exposure is being continued. In this case, the read signal charges are the first signals. It is to be noted that the first signals may be read once during the exposure, or may include signal charges that are read plural times from the photoelectric conversion units 11b.

During the exposure period, the read first signals are held in the vertical transfer sections 12. Then, after the read operation, signal charges are generated by the exposure in the photoelectric conversion units 11a and 11b. At the end of the exposure period, the color signals are read from the photoelectric conversion units 11a, and the luminance signals are read from the photoelectric conversion units 11b. In this case, the luminance signals read after the end of the exposure period are the second signals. After the end of the exposure period, the first signals held in the vertical transfer sections 12, and the read second signals and color signals (third signals) are vertically and horizontally transferred and output from the output amplifier 14 to the signal processing section 102.

With regard to a way to read the first signals during the exposure period, if a light emission section for emitting light to a subject during the exposure period is provided, the signal charges may be read from the photoelectric conversion units 11b during the exposure period, and signals which are read from the photoelectric conversion units 11b during a light-emission period of the light emission section may be divided into the first signals and the second signals. Examples of the light emission section include the electronic flash device.

Figure 4:
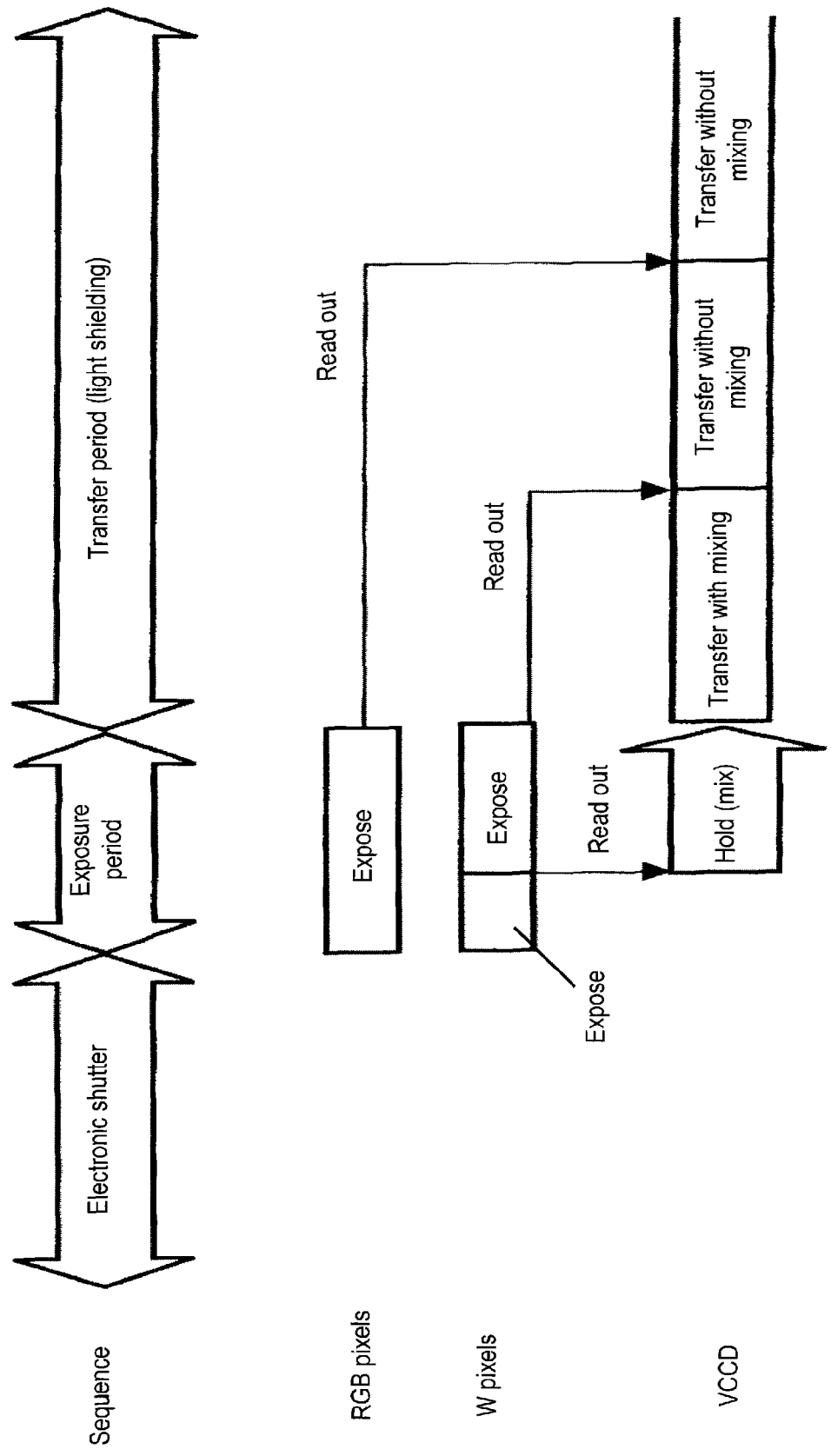
FIG. 4 is a view for illustrating another example of the operation of the imaging apparatus.

FIG. 4 is a view for illustrating another example of the operation of the imaging apparatus of the present embodiment.

Similarly to the operation of FIG. 3, the solid-state imaging device 20 firstly drives the electronic shutter to start the exposure period and, simultaneously, it is started to expose the photoelectric conversion units 11a for extracting the color components (RGB pixel) and the photoelectric conversion units 11b for extracting the luminance component (W pixel). After a predetermined time period elapses from the start of the exposure period, signal charges accumulated in the photoelectric conversion units 11b are temporarily read into the vertical transfer sections 12 while the exposure is being continued. In this case, the read signal charges are the first signals. It is to be noted that the first signals may be read once during the exposure period, or may include signal charges that are read plural times from the photoelectric conversion units 11b.

The operation shown in FIG. 4 is different from the operation of FIG. 3 in that signal charges of the read first signals are vertically mixed in the vertical transfer sections 12. The mixed first signals are held in the vertical transfer sections 12 during the exposure period. After the first signals are read, signal charges are generated by the exposure in the photoelectric conversion units 11a and 11b. At the end of the exposure period, the color signals are read from the photoelectric conversion units 11a, and the luminance signals are read from the photoelectric conversion units 11b. In this case, the luminance signals read after the end of the exposure period are the second signals. After the end of the exposure period, the first signals held in the vertical transfer sections 12, and the read second signals and color signals are vertically and horizontally transferred and output from the output amplifier 14 to the signal processing section 102.

The example shown in FIG. 4, a period for reading the first signals is shorter than a period for reading the second signals.

Figure 5:
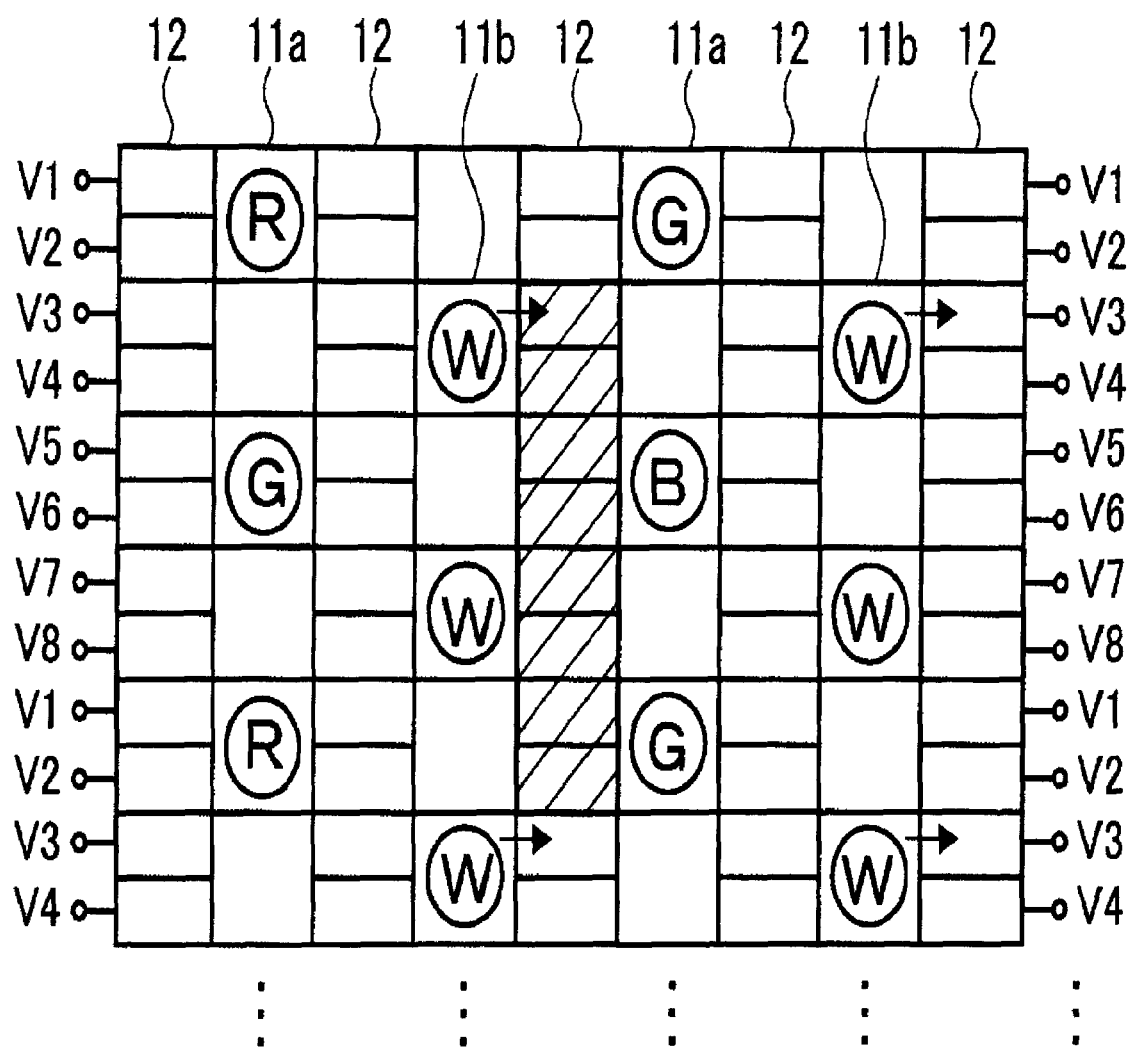
FIG. 5 is a view for showing a state of signal charges at the time of a read operation shown in FIG. 4.
Figure 6:
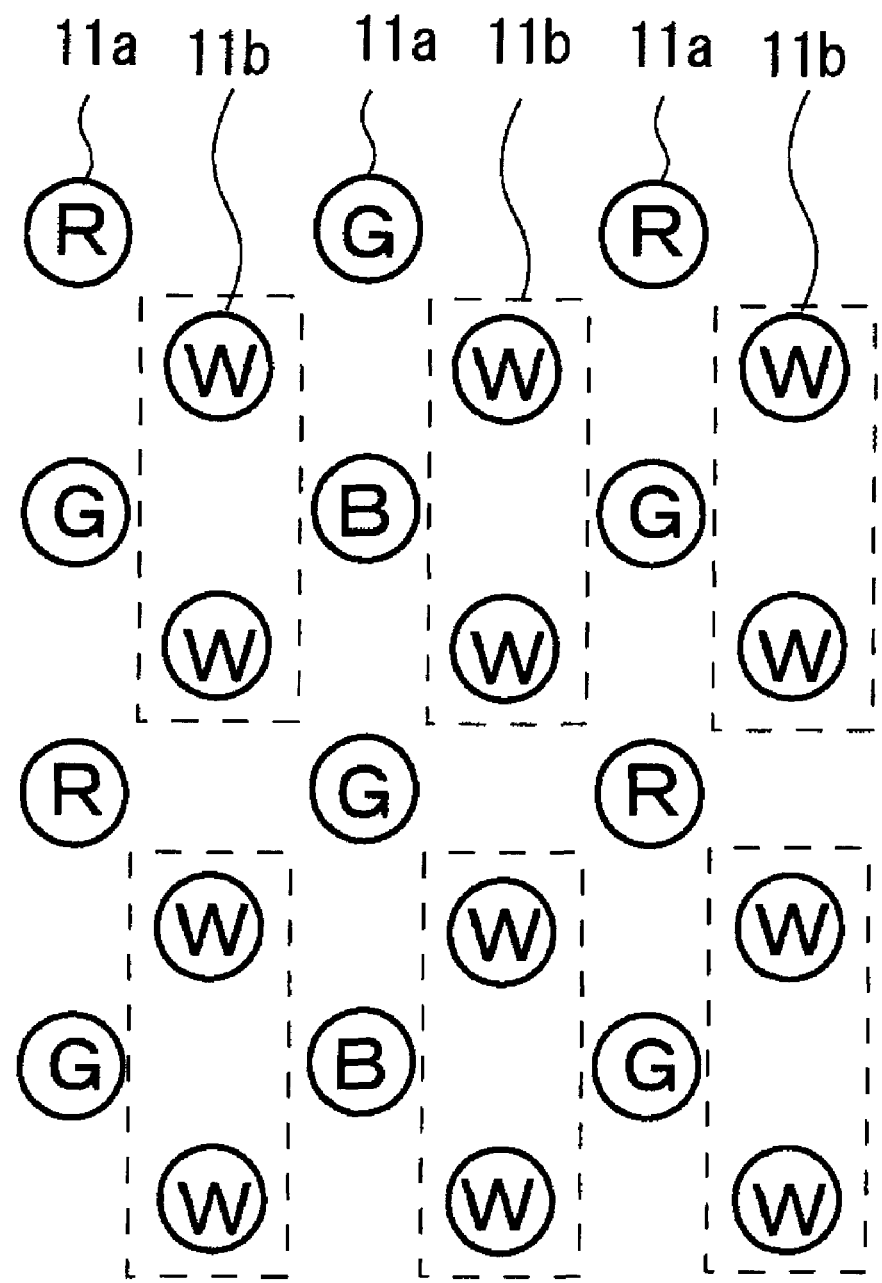
FIG. 6 is a schematic view for illustrating mixing of signal charges.

FIG. 5 shows a state of signal charges at the time of the read operation shown in FIG. 4. FIG. 6 is a schematic view for illustrating mixing of signal charges.

As shown in FIG. 5, a hatched area represents an area in the vertical transfer section 12 to which the first signal (the W signal) read from the photoelectric conversion unit 11b is vertically transferred. The read W signal is vertically mixed in the vertical transfer section 12. In the vertical mixing, for example, as shown in FIG. 6, two pixels are mixed by mixing the W signal in an odd row and the W signal in an even row below the odd row. In FIG. 6, the W signals surrounded by dotted lines are illustrated as the W signals to be mixed together. With this configuration, it becomes possible to perform eight-phase transfer drive by executing the read operation shown in FIG. 5. Since the eight-phase drive allows to accumulate charges in six electrodes out of the vertical transfer electrodes V1 to V8, it is possible to accumulate the charges which are triple the charges obtained in the case where the charges are accumulated in two electrodes in four-phase drive. It is also possible to increase the saturation charge quantity per one pixel by 1.5 times even when the charges are doubled by the mixing operation.

When the read first signals are mixed, it is possible to achieve the effect of expanding the low-frequency dynamic range with an improved low-frequency noise can be obtained by performing averaging processing for the first signals and the second signals read after the exposure period. Specifically, after low-frequency components are detected from the first signals using a low-pass filter, and low-frequency components are detected from the second signals using the low-pass filter, the averaging processing is performed for the low-frequency components of the first and second signals, and the averaged low-frequency components and high-frequency components of the second signals are synthesized to thereby expand the low-frequency dynamic range of the luminance signals.

Next, description will be given on another example of the structure of the imaging apparatus according to the present invention with reference to the drawings. In this embodiment, as for the components having the same structures and performing the same operations as those described above, description thereon will be simplified or omitted by assigning the same or corresponding reference numerals in the drawings.

Figure 7:
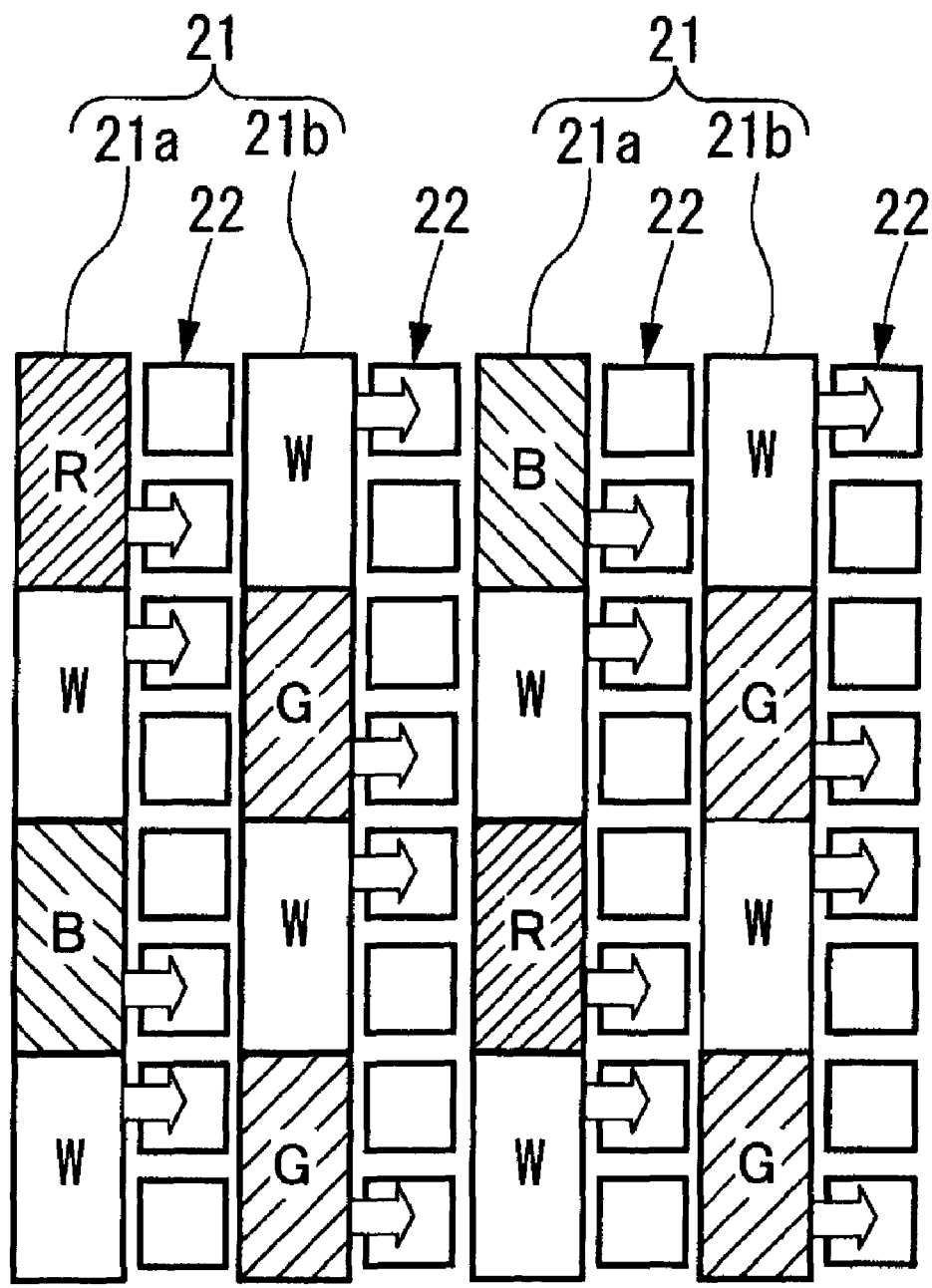
FIG. 7 is a view for illustrating one example of the read operation in another arrangement structure of photoelectric conversion units.
Figure 8:
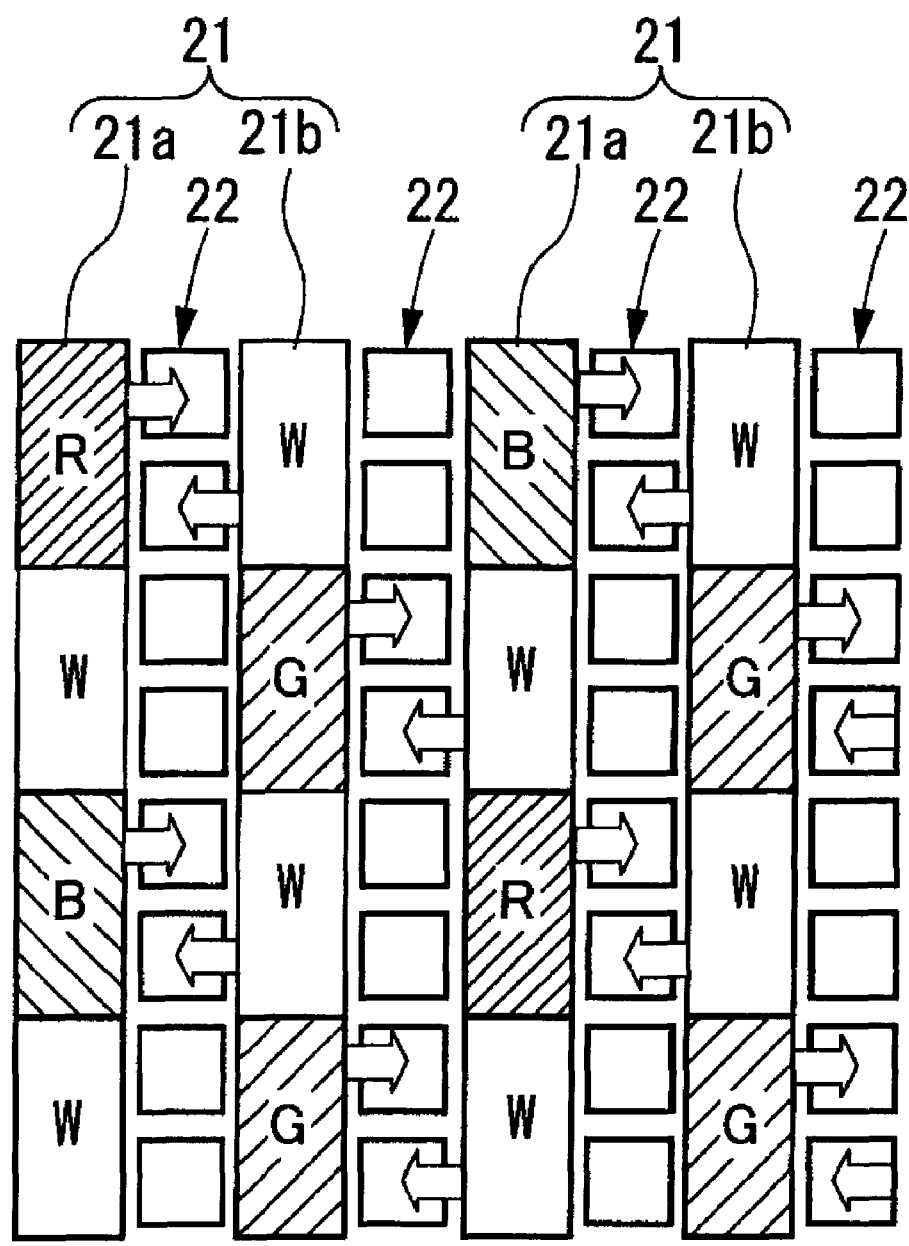
FIG. 8 is a view for illustrating another example of the read operation in the other arrangement structure of the photoelectric conversion units.

In the solid-state imaging devices shown in FIGS. 7 and 8, photoelectric conversion units 21a and 21b are disposed on a surface of a semiconductor substrate in row and column directions, and the photoelectric conversion units 21a for extracting the color components and the photoelectric conversion units 21b for extracting the luminance component are arranged at an identical arrangement pitch in an arrangement obtained by slanting square lattice configuration having a 2×2 period. The photoelectric conversion units 21a and 21b are disposed in a lattice configuration in a state where the Bayer arrangement is slanted by about 45 degrees.

In the solid-state imaging device shown in FIG. 7, the color signals detected in the photoelectric conversion units 21a and the luminance signals detected in the photoelectric conversion units 21b are read into vertical transfer sections 22 on the same side. At the time of the transfer, the color signals are read into the n-th, (n+4)-th, (n+8)-th . . . vertical transfer electrodes in the column direction (n is an arbitrary integer such as n=1, 2, 3 . . . ) among a plurality of vertical transfer electrodes provided to extend in the column direction. Also, the luminance signals are read into the (n+1)-th, (n+5)-th, (n+9)-th . . . vertical transfer electrodes in the column direction among the plurality of vertical transfer electrodes disposed to extend in the column direction. In accordance with the arrangement of the photoelectric conversion units shown in FIG. 7, the first signals read during the exposure period, and the second signals and the color signals, which are read after the exposure period, can be vertically transferred with the four-phase drive.

In the solid-state imaging device shown in FIG. 8, the color signals detected in the photoelectric conversion units 21a and the luminance signals detected in the photoelectric conversion units 21b are read into the vertical transfer sections 22 on mutually opposite sides. In FIG. 8, the color signals detected in the photoelectric conversion units 21a are read into the vertical transfer sections 22 on the right side thereof in the drawing, and the luminance signals detected in the photoelectric conversion units 21b are read into the vertical transfer sections 22 on the left side thereof in the drawing. At the time of the transfer, the color signals are read into the n-th, (n+4)-th, (n+8)-th . . . vertical transfer electrodes in the column direction among the plurality of vertical transfer electrodes provided to extend in the column direction. Also, the luminance signals are read into the (n+1)-th, (n+5)-th, (n+9)-th . . . vertical transfer electrodes in the column direction among the plurality of vertical transfer electrodes provided to extend on the opposite side. With the arrangement of the photoelectric conversion units shown in FIG. 8, the first signals read during the exposure period, and the second signals and the color signals, which are read after the exposure period, can be vertically transferred with the four-phase drive.

In the arrangement structures of the photoelectric conversion units shown in FIGS. 7 and 8, pixel signals can be read in a manner similar to the read operation of the solid-state imaging device having the arrangement structure of the photoelectric conversion units shown in FIG. 2. That is, it is possible to simultaneously start to expose the photoelectric conversion units 21a for extracting the color components and expose the photoelectric conversion units 21b for extracting the luminance component, and read the first signals from the photoelectric conversion units 21b and temporarily hold the first signals in the vertical transfer sections 22 during the exposure period.

In the embodiment described above, when the read operation of the first signals is performed during the exposure period, the phenomenon that an excessive current overflows from the photoelectric conversion units to the vertical transfer sections (what is called the blooming phenomenon) may occur. Such a phenomenon is especially observed in the case where a pulse width for the read operation is wide. However, an increase in pulse width has an advantage in that the read operation into the vertical transfer sections can be reliably performed. By making the pulse width for the read operation during the exposure period narrower than that that after the end of the exposure, even if unread signal charges occur in the read operation during the exposure period, it becomes possible to read the unread signal charges in the read operation at the end of the exposure period, and to read the same amount of the signal charges as a whole.

In accordance with the embodiments of the present invention, by holding the signal charges generated in the first photoelectric conversion units for extracting the luminance component as the first signals during the exposure period, it is possible to reset the saturation charge quantity of each of the first photoelectric conversion units and, thereafter, continuously accumulate the signal charges during the exposure period. With this configuration, an apparent saturation charge quantity of each first photoelectric conversion unit can be increased. By outputting the first and second signals in this manner, the dynamic range of the luminance signals can be increased and an image with high quality can be obtained as compared with the structure of a comparative example in which the luminance signals are read only once for one exposure period. In addition, since the exposure periods for the first and second photoelectric conversion units are simultaneously started and ended, the simultaneity in time can be secured when the luminance signals and the color signals are combined after they are output, and an image without unnaturalness when viewed can be obtained.

By detecting signals obtained by combining the first signals read during the exposure period and the second signals read at the end of the exposure period, an expansion in dynamic range can be achieved as a result. Consequently, the effect similar to an increase in saturation charge quantity can be obtained.

Also, the first signals and the second signals may be mixed in the vertical transfer sections or the horizontal transfer section and then be output to the signal processing section.

The above description has been made, using the example of the CCD-type solid-state imaging device. However, the configuration of the solid-state imaging device is not limited thereto. For example, as described below, the solid-state imaging device may have the CMOS-type configuration.

Figure 9:
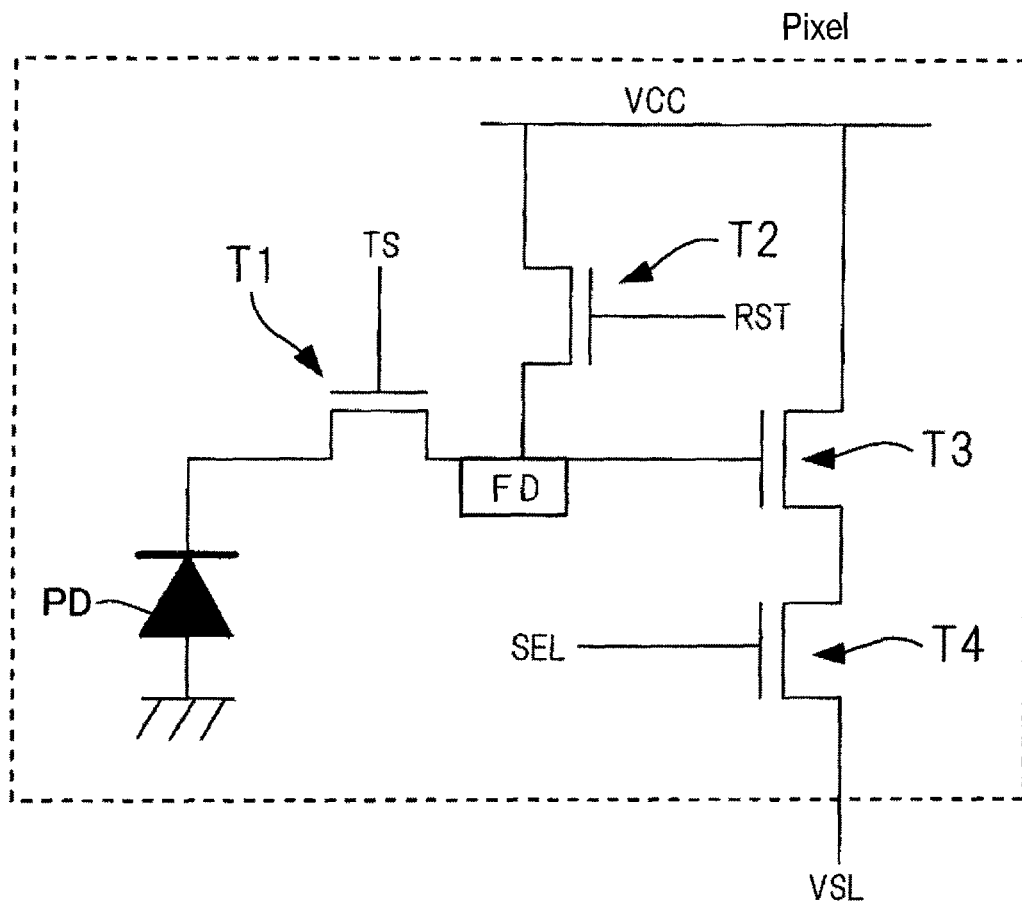
FIG. 9 is a schematic diagram for illustrating another structure of the solid-state imaging device.

A solid-state imaging device shown in FIG. 9 is a CMOS image sensor in which a plurality of pixels are arranged on a surface of a semiconductor substrate. The plurality of pixels include chromatic color pixels and high-sensitivity pixels having higher sensitivity to incident light than the chromatic color pixels. For example, the high-sensitivity pixels and the chromatic color pixels may be arranged at the same pitch at positions shifted from each other by one half of the arrangement pitch in row and column directions. Also, the high-sensitivity pixels and the chromatic color pixels may be arranged at the same pitch in an arrangement obtained by slanting a square lattice configuration having a 2×2 period.

Each pixel includes a photo diode PD, a transfer transistor T1, a reset transistor T2, an amplifier transistor T3 and a selection transistor T4. The anode of the photo diode PD is grounded.

The transfer transistor T1 is connected between the cathode of the photo diode PD and a floating diffusion section FD, and transfers electric charges generated in the photo diode PD to the floating diffusion section FD based on a transfer pulse TS supplied to the gate of the transfer transistor T1. The reset transistor T2 is connected between a power source and the floating diffusion section FD, and resets a potential of the floating diffusion section FD to a power-source potential VCC based on a reset pulse RST supplied to the gate of the reset transistor T2.

The gate of the amplification transistor T3 is connected to the floating diffusion section FD. This amplification transistor T3 is connected to a vertical signal line VSL through the selection transistor T4. When the selection transistor T4 is turned on based on a pixel selection signal SEL, the amplification transistor T3 amplifies the potential of the floating diffusion section FD to output a voltage to the vertical signal line VSL in response to the amplified potential.

In the CMOS-type solid-state imaging device, the floating diffusion sections FD serves as the pixel signal holding section. That is, the floating diffusion sections FD hold first signals read from the high-sensitivity pixels.

Figure 10:
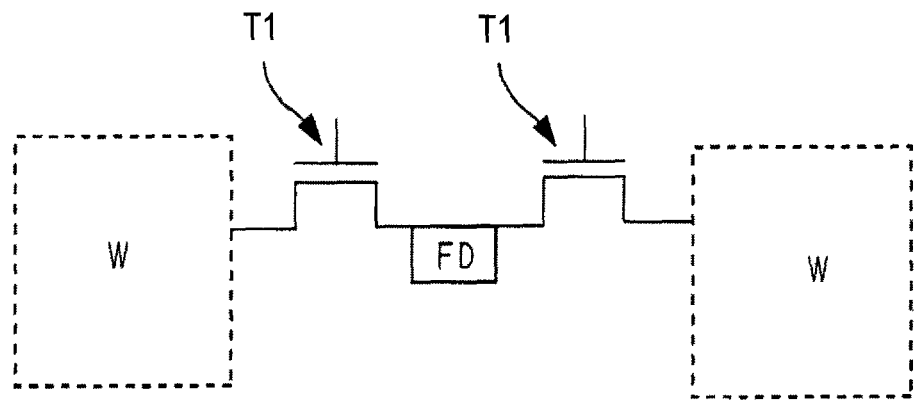
FIG. 10 is a schematic view for illustrating mixing of signal charges in the other structure of the solid-state imaging device.

Also, signals may be mixed and then held by the pixel signal holding section. In this case, as shown in FIG. 10, the floating diffusion section FD shared by adjacent high-sensitivity pixels (designated by W in the figure) are provided between the adjacent high-sensitivity pixels. The transfer transistor T1 is provided between each of the adjacent high-sensitivity pixels and the floating diffusion section FD. When the respective transfer transistors T1 are turned on during an exposure period, the first signals are read from the respective high-sensitivity pixels, and are mixed in the floating diffusion section FD and held as they are. It is noted that the CMOS-type solid-state imaging device may have a well-known configuration.

Although not-shown in the drawings, an imaging apparatus having the CMOS-type solid-state imaging device includes a control section and a signal processing section. The control section causes the solid-state imaging device to simultaneously start exposing the chromatic color pixels and exposing the high-sensitivity pixels, to read first signals from the high-sensitivity pixels during an exposure period, respectively and hold the read first signals, thereafter, to read second signals from the high-sensitivity pixels, respectively, and to read third signals from the chromatic color pixels, respectively. The signal processing section produces chromatic color image data based on the first signals, the second signals and the third signals.

Figure 11:
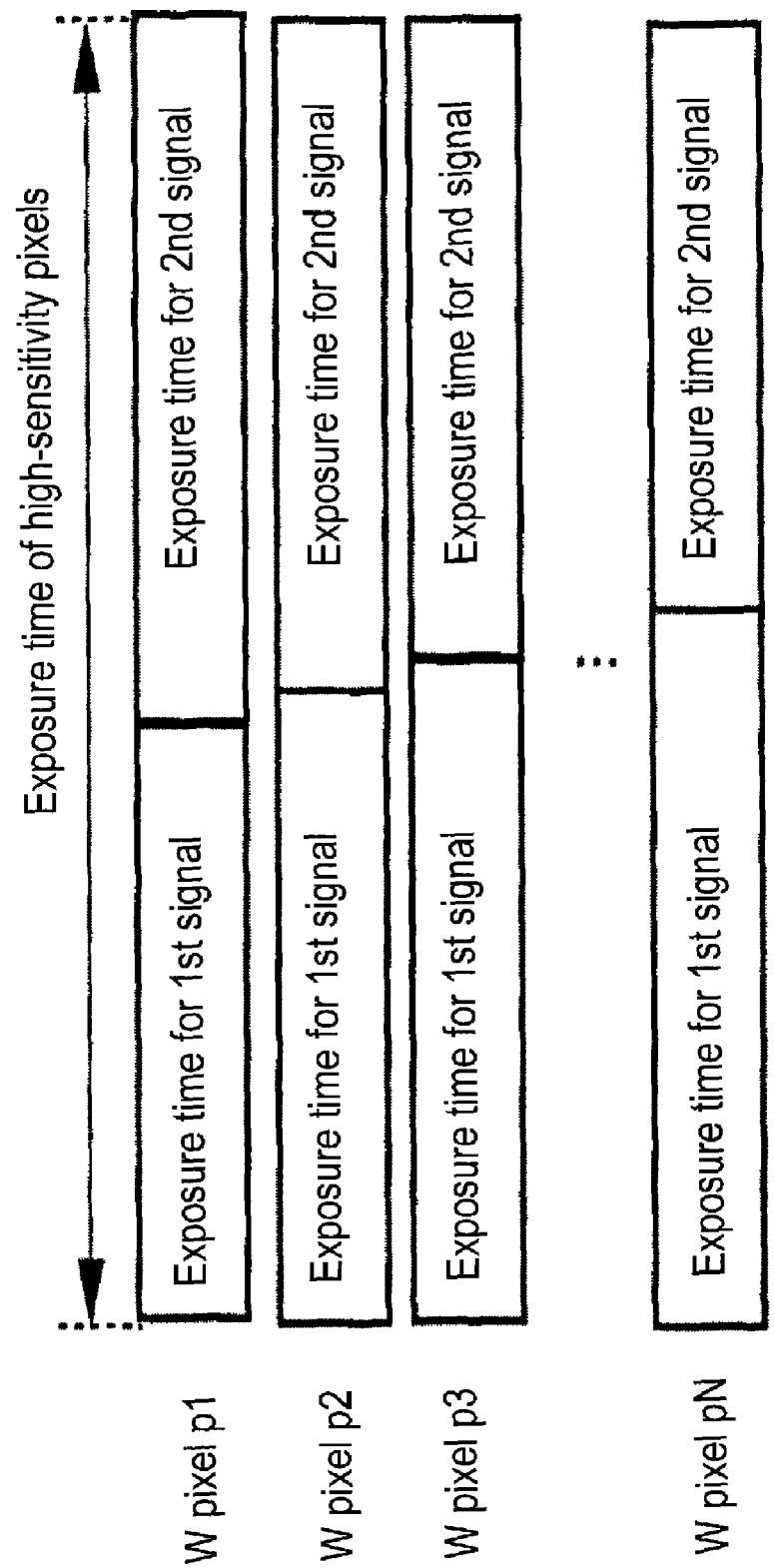
FIG. 11 is a diagram for explaining an example of exposure periods for the high-sensitivity pixels in a CMOS-type solid-state imaging device.

Also, the CMOS-type solid-state imaging device may sequentially select pixels or lines for read. FIG. 11 shows exposure periods of high-sensitivity pixels p1, p2, . . . , pN in the CMOS-type solid-state imaging device. In this case, the exposure periods of the high-sensitivity pixels are started simultaneously, that is, exposures for the first signals are started simultaneously. However, the high-sensitivity pixels are different in time at which a first signal is read (the "time" indicates a point in time at which reading of a signal is performed). The high-sensitivity pixels are also different in exposure period corresponding to the first signal. On the other hand, the exposure periods of the high-sensitivity pixels are ended simultaneously, that is, ends of the exposure period for the second signals are the same among the high-sensitivity pixels. Therefore, the high-sensitivity pixels are different in exposure period for the second signal. However, the entire exposure periods are the same among the high-sensitivity pixels. That is, the entire exposure periods of the high-sensitivity pixels each of which is a sum of the exposure period for the first signal and the exposure period for the second signal are always equal to each other, and the first signals and the second signals, which are read from the respective high-sensitivity pixels, can be combined. Therefore, if starts of the exposure periods for the first signals are the same among the high-sensitivity pixels and if ends of the exposure periods for the second signals are the same among the high-sensitivity pixels, this embodiment of the invention can be applied to the case where a timing at which the first signals are read from at least a part of the higher sensitivity pixels is different from a timing at which the first signals are read from another part of the high sensitivity pixels.

What is claimed is:
1. An imaging apparatus comprising:
a solid-state imaging device including a plurality of pixels arranged on a surface of a semiconductor substrate, wherein the plurality of pixels include a plurality of chromatic color pixels for plural colors and a plurality of high-sensitivity pixels having a higher sensitivity to incident light than the chromatic color pixels;
a drive section that controls the solid-state imaging device
    to simultaneously start exposing the chromatic color pixels and exposing the high-sensitivity pixels,
    to read first signals from the high-sensitivity pixels during an exposure period, respectively and hold the read first signals, thereafter, to read second signals from the high-sensitivity pixels, respectively, and
to read third signals from the chromatic color pixels, respectively; and
a signal processing section that produces color image data based on the first signals, the second signals and the third signals.

2. The imaging apparatus of claim 1, wherein the high-sensitivity pixels and the chromatic color pixels are arranged at an identical arrangement pitch at positions shifted from each other by one half of the arrangement pitch in row and column directions.

3. The imaging apparatus of claim 1, wherein the high-sensitivity pixels and the chromatic color pixels are arranged at an identical arrangement pitch in an arrangement obtained by slanting a square lattice configuration having a 2×2 period.

4. The imaging apparatus of claim 1, wherein the first signals include signal charges that are read plural times from the high-sensitivity pixels during the exposure period.

5. The imaging apparatus of claim 1, wherein a period for reading the first signals is shorter than a period for reading the second signals.

6. The imaging apparatus of claim 1, further comprising:
a light emission section that emits light to a subject during the exposure period, wherein
signal charges are read from the high-sensitivity pixels and are divided into the first signals and the second signals based on a light emission period of the light emission section, during the exposure period.

7. The imaging apparatus of claim 1, wherein the first, second and third signals are output to the signal processing section after an end of the exposure period.

8. The imaging apparatus of claim 1, wherein the first and second signals are output to the signal processing section in a state where the first and second signals are mixed to each other.

9. The imaging apparatus of claim 1, wherein a timing at which the first signals are read from at least a part of the higher sensitivity pixels is different from a timing at which the first signals are read from another part of the high sensitivity pixels.

10. The imaging apparatus of claim 1, further comprising:
a pixel-signal holding section that holds the first signals.

11. The imaging apparatus of claim 10, wherein the first signals are held in the pixel-signal holding section in a state where the first signals have been mixed.

12. The imaging apparatus of claim 10, further comprising:
a vertical transfer section that transfers signal charges read from the plurality of pixels, in a column direction; and
a horizontal transfer section that transfers the signal charges, which are transferred from the vertical transfer section, in a row direction, wherein
the vertical transfer section includes the pixel holding section.

13. A method for driving an imaging apparatus including a solid-state imaging device, wherein the solid-state imaging device includes a plurality of pixels arranged on a surface of a semiconductor substrate, and the plurality of pixels have a plurality of chromatic color pixels for plural colors and a plurality of high-sensitivity pixels having a higher sensitivity to incident light than the chromatic color pixels, the method comprising:
simultaneously starting exposing the color pixels and exposing the high-sensitivity pixels,
reading first signals from the high-sensitivity pixels during an exposure period, respectively;
holding the read first signals;
thereafter, reading second signals from the high-sensitivity pixels respectively;
reading third signals from the chromatic color pixels respectively; and
producing color image data based on the first signals, the second signals and the third signals.

14. The method of claim 13, wherein the high-sensitivity pixels and the chromatic color pixels are arranged at an identical arrangement pitch at positions shifted from each other by one half of the arrangement pitch in row and column directions.

15. The method of claim 13, wherein the high-sensitivity pixels and the chromatic color pixels are arranged at an identical arrangement pitch in an arrangement obtained by slanting a square lattice configuration having a 2×2 period.

16. The method of claim 13, wherein the first signals include signal charges that are read plural times from the high-sensitivity pixels during the exposure period.

17. The method of claim 13, wherein a period for reading the first signals is shorter than a period for reading the second signals.

18. The method of claim 13, wherein
the imaging apparatus further includes a light emission section that emits light to a subject during the exposure period,
signal charges are read from the high-sensitivity pixels and are divided into the first signals and the second signals based on a light emission period of the light emission section, during the exposure period.

19. The method of claim 13, wherein the first, second and third signals are output to a signal processing section that produces the color image data, after an end of the exposure period.

20. The method of claim 13, wherein the first and second signals are output to a signal processing section that produces the color image data, in a state where the first and second signals are mixed to each other.

21. The method of claim 13, wherein a timing at which the first signals are read from at least a part of the higher sensitivity pixels is different from a timing at which the first signals are read from another part of the high sensitivity pixels.

22. The method of claim 13, further comprising:
holding the first signals in a pixel-signal holding section.

23. The method of claim 22, wherein the first signals are held in the pixel-signal holding section in a state where the first signals have been mixed.

24. The method of claim 22, wherein
the imaging apparatus includes
a vertical transfer section that transfers signal charges read from the plurality of pixels, in a column direction, and
a horizontal transfer section that transfers the signal charges, which are transferred from the vertical transfer section, in a row direction,
the vertical transfer section includes the pixel holding section.

* * * * *